United States Patent
Sebire et al.

(10) Patent No.: US 10,631,194 B2
(45) Date of Patent: Apr. 21, 2020

(54) CROSS REPORTING OF EMPTY OR NON-EMPTY BUFFERS IN DUAL CONNECTIVITY

(71) Applicant: Nokia Solutions and Networks Oy, Espoo (FI)

(72) Inventors: Benoist Pierre Sebire, Tokyo (JP); Chunli Wu, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/126,998

(22) PCT Filed: Mar. 21, 2014

(86) PCT No.: PCT/EP2014/055674
§ 371 (c)(1),
(2) Date: Sep. 16, 2016

(87) PCT Pub. No.: WO2015/139764
PCT Pub. Date: Sep. 24, 2015

(65) Prior Publication Data
US 2017/0111818 A1    Apr. 20, 2017

(51) Int. Cl.
*H04W 28/02* (2009.01)
*H04W 72/12* (2009.01)
(Continued)

(52) U.S. Cl.
CPC ........... *H04W 28/0278* (2013.01); *H04L 5/00* (2013.01); *H04W 72/1284* (2013.01);
(Continued)

(58) Field of Classification Search
CPC ......... H04W 28/0278; H04W 72/1284; H04W 80/02; H04L 69/14; H04L 5/00; H04L 69/23; H04L 5/001; H04L 69/321
See application file for complete search history.

(56) References Cited

U.S. PATENT DOCUMENTS

2010/0074230 A1* 3/2010 Ishii ................. H04W 72/1252
370/336
2011/0080881 A1* 4/2011 Hsu ..................... H04W 52/365
370/329
(Continued)

FOREIGN PATENT DOCUMENTS

EP    2557878 A1 *   2/2013   ........... H04L 5/1469
EP    2557878 A1     2/2013
(Continued)

OTHER PUBLICATIONS

International Search Report and Written Opinion received for corresponding Patent Cooperation Treaty Application No. PCT/EP2014/055674, dated Jan. 23, 2015, 14 pages.
(Continued)

*Primary Examiner* — Mehmood B. Khan
(74) *Attorney, Agent, or Firm* — Squire Patton Boggs (US) LLP

(57) ABSTRACT

Various communication systems may benefit from buffer reporting. For example, in systems in which user equipment may use dual connectivity, it may be useful to provide cross-reporting of empty or non-empty buffers to each base station. A method can include determining, at a device for a plurality of cell groups, whether there is data to transmit on each cell group. The method can also include cross-reporting, to a base station of a first cell group of the plurality of cell groups, a buffer status indication corresponding to a second cell group of the plurality of cell groups. The buffer status indication can be a binary indication corresponding to the second cell group.

9 Claims, 4 Drawing Sheets

(51) Int. Cl.
*H04L 5/00* (2006.01)
*H04W 80/02* (2009.01)
*H04L 29/06* (2006.01)
*H04L 29/08* (2006.01)

(52) U.S. Cl.
CPC .............. *H04L 5/001* (2013.01); *H04L 69/14* (2013.01); *H04L 69/321* (2013.01); *H04W 80/02* (2013.01)

(56) References Cited

U.S. PATENT DOCUMENTS

| | | | | |
|---|---|---|---|---|
| 2011/0269393 | A1* | 11/2011 | Ostergaard | H04B 7/155 455/7 |
| 2011/0310937 | A1* | 12/2011 | Lin | H04L 5/001 375/219 |
| 2013/0039231 | A1* | 2/2013 | Wang | H04W 72/10 370/280 |
| 2014/0269352 | A1* | 9/2014 | Sun | H04W 72/1284 370/250 |
| 2014/0348105 | A1* | 11/2014 | Rosa | H04W 72/1284 370/329 |
| 2014/0362829 | A1* | 12/2014 | Kazmi | H04W 36/22 370/332 |
| 2015/0131569 | A1* | 5/2015 | Rosa | H04L 1/0026 370/329 |
| 2015/0181593 | A1* | 6/2015 | Kim | H04W 24/02 370/329 |
| 2015/0215945 | A1* | 7/2015 | Hsu | H04L 47/21 370/254 |
| 2015/0271093 | A1* | 9/2015 | Cui | H04W 4/70 370/329 |
| 2015/0312942 | A1* | 10/2015 | Cui | H04W 4/70 370/329 |
| 2015/0334737 | A1* | 11/2015 | Susitaival | H04W 72/1284 370/329 |
| 2016/0050605 | A1* | 2/2016 | Kim | H04W 28/0278 370/331 |
| 2016/0157265 | A1* | 6/2016 | Lee | H04W 72/1284 370/329 |
| 2016/0198491 | A1* | 7/2016 | Lee | H04W 72/1284 455/450 |
| 2016/0227433 | A1* | 8/2016 | Lee | H04W 72/1242 |
| 2016/0227561 | A1* | 8/2016 | Susitaival | H04W 72/1252 |
| 2016/0286604 | A1* | 9/2016 | Heo | H04W 52/02 |
| 2016/0295442 | A1* | 10/2016 | Virtej | H04W 72/1284 |
| 2016/0381595 | A1* | 12/2016 | Lee | H04W 28/0278 370/329 |
| 2017/0013565 | A1* | 1/2017 | Pelletier | H04W 52/343 |
| 2017/0135097 | A1* | 5/2017 | Yi | H04W 24/02 |
| 2017/0238252 | A1* | 8/2017 | Dalsgaard | H04W 76/15 370/311 |

FOREIGN PATENT DOCUMENTS

| | | | | |
|---|---|---|---|---|
| EP | 2822210 | A3 * | 3/2015 | ........... H04L 1/0077 |
| EP | 2787677 | A3 * | 4/2016 | ........... H04L 5/0096 |
| EP | 3031269 | A1 * | 6/2016 | ........ H04W 72/0446 |
| WO | 2013113390 | A1 | 8/2013 | |
| WO | 2013116988 | A1 | 8/2013 | |
| WO | WO-2013113390 | A1 * | 8/2013 | ............ H04L 5/001 |
| WO | WO-2015104055 | A1 * | 7/2015 | |
| WO | WO-2016043867 | A1 * | 3/2016 | ............ H04W 76/15 |
| WO | WO-2016190626 | A1 * | 12/2016 | ............... H04L 5/14 |

OTHER PUBLICATIONS

PANTECH: "Consideration on UP Alternatives 2C and 3C" 3GPP Draft; R2-131797, 3rd Generation Partnership Project (3GPP), Mobile Competence Centre; 650, Route Des Lucioles; F-06921 Sophia-Antipolis Cedex; France vol. RAN @G2, No. Fukuoka, Japan; 20130520-20130524; May 11, 2013, XP050700055.

\* cited by examiner

CROSS REPORTING OF EMPTY OR
NON-EMPTY BUFFERS IN DUAL
CONNECTIVITY

RELATED APPLICATION

This application was originally filed as Patent Cooperation Treaty Application No. PCT/EP2014/055674 filed Mar. 21, 2014.

BACKGROUND

Field

Various communication systems may benefit from buffer reporting. For example, in systems in which user equipment may use dual connectivity, it may be useful to provide cross-reporting of empty or non-empty buffers to each base station.

Description of the Related Art

In dual connectivity (DC), a UE is able to be simultaneously connected to both a Master evolved node B (MeNB) and a Secondary eNB (SeNB) with two medium access control (MAC) entities configured for the master cell group (MCG) and secondary cell group (SCG) corresponding to the MeNB and SeNB respectively. Buffer status reports (BSR) can be used to report uplink (UL) buffer status of the UE to the eNB.

With two different MAC entities in dual connectivity, BSR to the MeNB can include buffer status of the bearers for which a logical channel is used in the MAC entity of the MCG, namely the MCG bearers and the split bearer(s). Similarly, BSR to the SeNB can include buffer status of the bearers for which a logical channel is used in the MAC entity of the SCG, namely the SCG bearers and the split bearer(s).

With an independent scheduler located at two eNBs connected with a non-ideal backhaul (X2 in DC), MeNB and SeNB may not be aware of the scheduling decision of the other scheduler. Power control, therefore, may become challenging. For example, combined scheduling could exceed UE maximum power in a case that both eNBs allocate too many physical resource blocks (PRBs).

A study on small cell enhancements was conducted in 3GPP, and is reported at 3GPP RP-122033 (see also RP-132069 and R2-140906), each of which three reports are hereby incorporated herein by reference in its respective entirety. In order to decrease signaling load toward the core network, as well as benefiting from flexible resource usage across eNBs, dual connectivity was investigated. In DC as studied, a UE is simultaneously connected to both a Master eNB (MeNB) and a Secondary eNB (SeNB). MeNB and SeNB are assumed to be connected via X2. The main characteristic of X2 in DC as studied is that it is a non-ideal backhaul link: transmission delays in the range of ~20 ms can happen, and the bit rate is limited, as described at 3GPP TS 36.932, which is hereby incorporated herein by reference in its entirety. The outcome of the study can be found in 3GPP TR 36.842, which is hereby incorporated herein by reference in its entirety. The conclusion of that report was that two different user plane architectures may be supported: 1A and 3C—shown in FIG. 1.

The cells from MeNB can be defined as Master Cell Group (MCG), and the cells from SeNB can be defined as the Secondary Cell Group (SCG). Two MAC entities can be configured to the UE for the MCG and SCG respectively.

FIG. 2 illustrates different type of bearers. Architecture 1A and 3C can be realized by different RRC configuration which leads to three different types of bearers: those bearers 210 served by MeNB alone, namely MCG bearers; bearers 220 served by MeNB and SeNB, also known as split bearer; and bearers 230 served by SeNB alone, namely SCG bearers.

For split bearer 220, two radio link control (RLC) entities can be used: one RLC entity for the MeNB and one RLC entity for the SeNB. Once a packet data convergence protocol (PDCP) packet data unit (PDU) is delivered to one RLC entity, all possible retransmissions may be managed by that RLC entity. Also, RLC status reports can conventionally only be exchanged by peer RLC entities of the same eNB. That is to say that RLC status reports for the MeNB can conventionally only be exchanged between the UE and the MeNB, while RLC status reports for the SeNB can conventionally only be exchanged between the UE and the SeNB.

Buffer status reports (BSR) can be used to report uplink (UL) buffer status of the UE to the eNB. Different logical channels (LCH) can be configured to different logical channel groups (LCGs) and the buffer status value can reflect data available for transmission for each LCG, as described at 3GPP TS 36.321 and 36.331, which are both hereby incorporated herein by reference in their respective entireties.

With two different MAC entities in dual connectivity (DC), a BSR to the MeNB can include buffer status of the bearers for which a logic channel is used in the MAC entity of the MCG, namely MCG bearers, and the split bearers, at least for the data available for transmission in the RLC layer of MCG. Similarly the BSR to the SeNB can includes buffer status of the bearers for which a logic channel is used in the MAC entity of the SCG, namely SCG bearers, and split bearers, at least data available for transmission in RLC entity of SCG. How the data available for transmission in PDCP layer of split bearer is still under discussion in 3GPP.

As noted above, with an independent scheduler located at two eNBs connected with a non-ideal backhaul, MeNB and SeNB may not be aware of the scheduling decision of the other scheduler. Power control, therefore, is challenging as UE maximum power could be exceeded if both eNBs allocate too many PRBs. Conversely, UE power could be underutilized if both schedulers are too conservative, which could reduce UL throughput.

One approach is for the UE in dual connectivity to always send two BSRs, one reflecting the status of each MAC entity. This approach may require each eNB to be aware of the BSR configuration of the other. Furthermore, this approach may use significant overhead.

SUMMARY

According to certain embodiments, a method can include determining, at a device for a plurality of cell groups, whether there is data to transmit on each cell group. The method can also include cross-reporting, to a base station of a first cell group of the plurality of cell groups, a buffer status indication corresponding to a second cell group of the plurality of cell groups. The buffer status indication can be a binary indication corresponding to the second cell group.

In certain embodiments, a method can include receiving, at a base station of a first cell group of a plurality of cell groups, a buffer status indication regarding a second cell group of the plurality of cell groups. The buffer status indication can be received from a device and can be a binary indication corresponding to the second cell group. The method can also include controlling, by the base station, scheduling of the device for the first cell group based on the buffer status indication.

A non-transitory computer-readable medium can, according to certain embodiments, be encoded with instructions that, when executed in hardware, perform a process. The process can correspond to any of the above-described methods.

A computer program product can, in certain embodiments, encode instructions for performing a process. The process can correspond to any of the above-described methods.

According to certain embodiments, an apparatus can include at least one processor and at least one memory including computer program code. The at least one memory and the computer program code can be configured to, with the at least one processor, cause the apparatus at least to determine, at a device for a plurality of cell groups, whether there is data to transmit on each cell group. The at least one memory and the computer program code can also be configured to, with the at least one processor, cause the apparatus at least to cross-report, to a base station of a first cell group of the plurality of cell groups, a buffer status indication corresponding to a second cell group of the plurality of cell groups. The buffer status indication can be a binary indication corresponding to the second cell group.

In certain embodiments, an apparatus can include at least one processor and at least one memory including computer program code. The at least one memory and the computer program code can be configured to, with the at least one processor, cause the apparatus at least to receive, at a base station of a first cell group of a plurality of cell groups, a buffer status indication regarding a second cell group of the plurality of cell groups. The buffer status indication can be received from a device and can be a binary indication corresponding to the second cell group. The at least one memory and the computer program code can also be configured to, with the at least one processor, cause the apparatus at least to control, by the base station, scheduling of the device for the first cell group based on the buffer status indication.

An apparatus, according to certain embodiments, can include means for determining, at a device for a plurality of cell groups, whether there is data to transmit on each cell group.

The apparatus can also include means for cross-reporting, to a base station of a first cell group of the plurality of cell groups, a buffer status indication corresponding to a second cell group of the plurality of cell groups. The buffer status indication can be a binary indication corresponding to the second cell group.

An apparatus, in certain embodiments, can include means for receiving, at a base station of a first cell group of a plurality of cell groups, a buffer status indication regarding a second cell group of the plurality of cell groups. The buffer status indication can be received from a device and can be a binary indication corresponding to the second cell group. The apparatus can also include means for controlling, by the base station, scheduling of the device for the first cell group based on the buffer status indication.

BRIEF DESCRIPTION OF THE DRAWINGS:

For proper understanding of the invention, reference should be made to the accompanying drawings, wherein.

DETAILED DESCRIPTION

Figure 1:
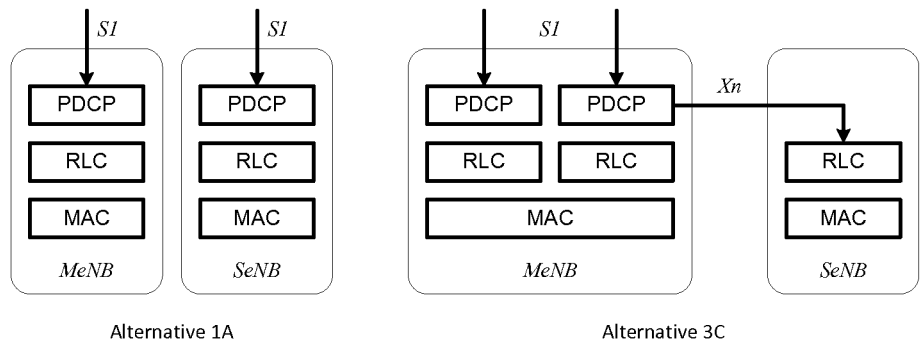
FIG. 1 illustrates user plane architectures 1A and 3C.

Certain embodiments may permit a first evolved Node B (eNB) to know whether there is any uplink (UL) transmission to another eNB, so the first eNB it can make full use of user equipment (UE) power in its own scheduling decisions. Thus, certain embodiments provide that a UE in dual connectivity (DC) performs cross cell group (CG) reporting of UL transmission buffer status without knowing logical channels group (LCG) configurations of that cell group. The report can be a single bit in the BSR that is used to indicate if there is data to transmit in the other CG.

Thus, in certain embodiments, in DC when BSR is triggered and reported for one MAC entity, the UE can also indicate whether there is data available for transmission for the other MAC entity. More particularly, certain embodiments can use only a single bit within a BSR to indicate/signal corresponding cell/CG if there is data to transmit in the other CG, without taking logical channels/LCG configurations of that cell group into account. Certain embodiments further describe a reporting trigger. In this way, as described herein, a UE in dual connectivity may perform cross cell reporting of UL transmission buffer status over two different MAC entities without knowing logical channels/LCG configurations of that cell group.

When a BSR is triggered and reported for one MAC entity, the UE can also indicate whether there is data available for transmission for the other MAC entity. Furthermore, to ensure up-to-date information or for other reasons, when the status of buffered data of the other MAC entity changes from empty to not empty, and vice versa, it can trigger a BSR/indication to the first MAC entity.

To make the eNB also aware of UL transmission of other channels, the configuration of, for example, a periodic channel quality indicator (CQI) on physical uplink control channel (PUCCH) could be exchanged between SeNB and MeNB via X2.

The above and other embodiments can be implemented in a variety of ways. For example, one of the formerly reserved bits in the BSR MAC control element (CE) sub-header can be used to indicate an empty buffer for the other MAC entity. Alternatively, a new MAC CE with new LCID of fixed payload size zero bit can be used to indicate empty buffer for the other MAC entity.

In another alternative, a new logical channel identifier (LCID) can be used for the existing BSR to indicate an empty buffer for the other MAC entity. In this case, in total, three new LCIDs may then be needed for the three BSRs, i.e. Long BSR, Short BSR and truncated BSR. As another option, an extra byte can be added to indicate total buffer status of the other MAC entity.

These alternatives can be further illustrated. For example, if a BSR is triggered for the MCG and reported to the MeNB, according to the first option above one of the reserved bits in the BSR MAC CE sub-header for MCG is used to indicate whether there is data available for transmission for the SCG, namely whether there is an empty buffer status or not.

According to the second option mentioned above, a new LCID can be introduced to indicate empty buffer for SCG. In addition to the BSR MAC CE for the MCG itself, the MAC packet data unit (PDU) includes the new LCID sub-header, without payload, only when BSR for SCG is empty, otherwise it does not include it. In a variation, the sub-header may be included only when the buffer is not empty.

As another option, a new LCID can be used for the BSR MAC CE for MCG to indicate BSR for SCG is empty so that the extra byte in the previous option can be saved. In other words, taking the long BSR as an example, there can be two ways to report the long BSR: the existing one, and a new one, with a new LCID that would implicitly indicate empty buffers for the other MAC entity.

For more detailed information, another option is to include total buffer status (BS) of SCG with one byte following the BSR MAC CE for MCG.

Whether this additional reporting is used or not could be configured by RRC. Taking the second alternative above as an example, the additional LCID can be designed only to be sent if so configured by RRC.

The above example has focused on when a BSR is triggered for MCG. Nevertheless, the same principles can apply when BSR is triggered for SCG.

Figure 3:
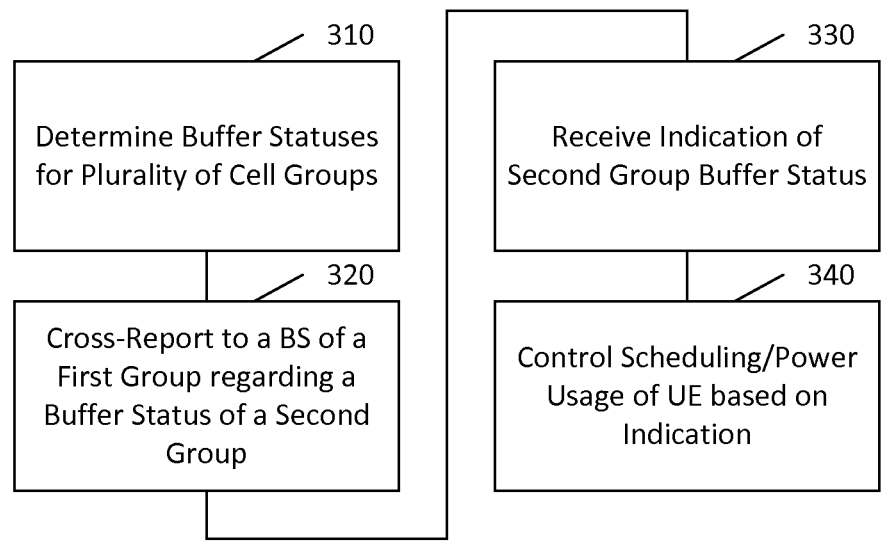
FIG. 3 illustrates a method according to certain embodiments.

FIG. 3 illustrates a method according to certain embodiments. As shown in FIG. 3, a method can include, at 310, determining, at a device for a plurality of cell groups, whether there is data to transmit on each cell group. For example, there may be two cell groups: a master cell group and a secondary cell group.

The method can also include, at 320, cross-reporting, to a base station of a first cell group of the plurality of cell groups, a buffer status indication corresponding to a second cell group of the plurality of cell groups. The buffer status indication can be a binary indication corresponding to the second cell group.

In this method, the first base station can be left uninformed regarding logical channel group configurations of the second cell group. More particularly, in certain embodiments it may not be necessary or important for the first base station to be informed regarding logical channel group configurations of the second cell group.

Figure 2:
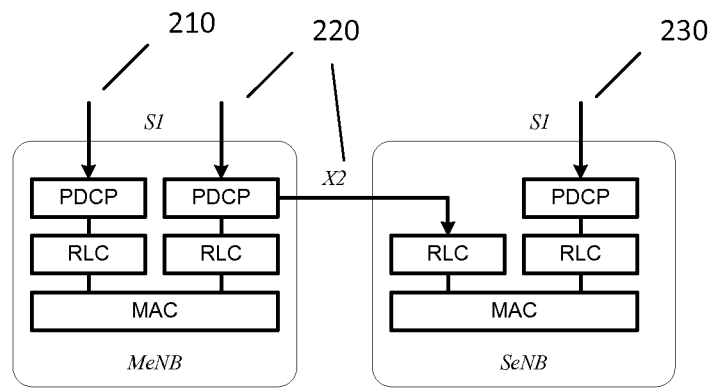
FIG. 2 illustrates different type of bearers.

The device can include a first medium access control entity corresponding to the first cell group and a second medium access control entity corresponding to the second cell group. Thus, for example, the device may be arranged as illustrated, for example, in FIG. 2.

Various triggers can be used with respect to the cross-reporting at 320 in FIG. 3. For example, the cross-reporting can be triggered when a buffer status report is triggered for the first cell group. In addition, or alternatively, the cross-reporting can be triggered when a buffer status of the second cell group changes from empty to not-empty or from not-empty to empty. Thus, at either or both of these transitions between empty and not-empty, cross-reporting can be triggered.

The binary indication can be provided as a single bit indication in a buffer status report (BSR) medium access control (MAC) control element (CE) sub-header for the first cell group. Alternatively, the binary indication can be provided using a new logical channel identifier in the subheader for the new MAC CE with fixed payload size zero bit indicating buffer status for the second cell group. As a further alternative, the binary indication is provided using a logical channel identifier for the BSR MAC CE corresponding to the first cell group.

The method can also include, at 330, receiving, the buffer status indication from the device at the first base station. The method can further include, at 340, controlling, by the base station, scheduling of the device for the first cell group based on the buffer status indication. This scheduling can be used to take advantage of available UE power or to avoid overtaxing the available UE power.

Figure 4:
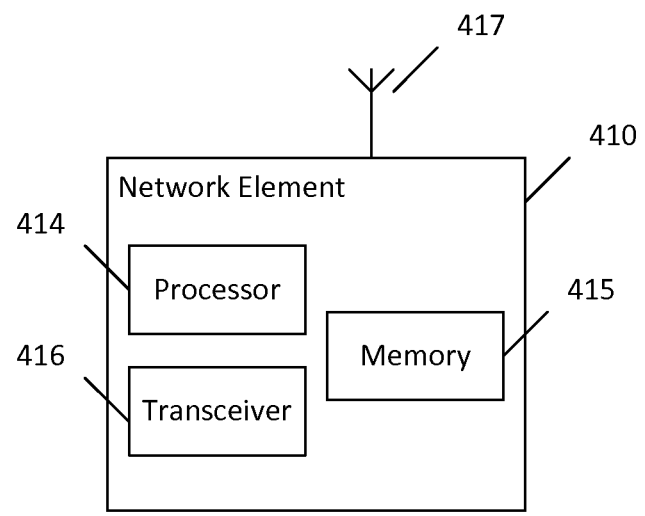
FIG. 4 illustrates a system according to certain embodiments.
Figure 4:
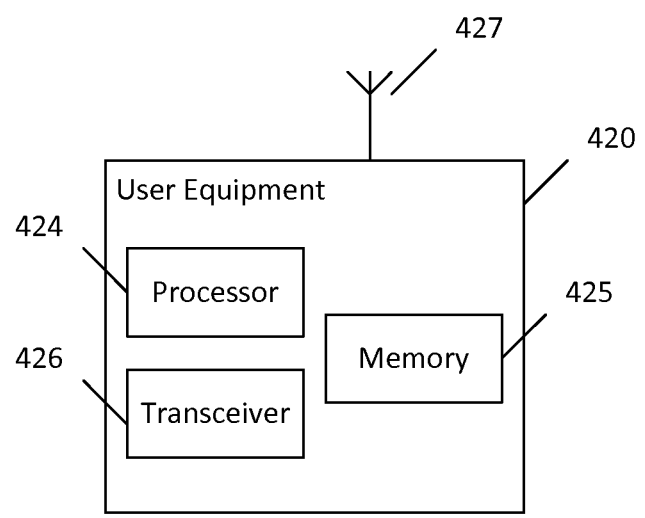

FIG. 4 illustrates a system according to certain embodiments. It should be understood that each block of the flowchart of FIG. 3 and any combination thereof may be implemented by various means or their combinations, such as hardware, software, firmware, one or more processors and/or circuitry. In one embodiment, a system may include several devices, such as, for example, network element 410 and user equipment (UE) or user device 420. The system may include more than one UE 420 and more than one network element 410, although only one of each is shown for the purposes of illustration. A network element can be an access point, a base station, an eNode B (eNB), server, host or any other network element discussed herein or the like. Each of these devices may include at least one processor or control unit or module, respectively indicated as 414 and 424. At least one memory may be provided in each device, and indicated as 415 and 425, respectively. The memory may include computer program instructions or computer code contained therein. One or more transceiver 416 and 426 may be provided, and each device may also include an antenna, respectively illustrated as 417 and 427. Although only one antenna each is shown, many antennas and multiple antenna elements may be provided to each of the devices. Other configurations of these devices, for example, may be provided. For example, network element 410 and UE 420 may be additionally configured for wired communication, in addition to wireless communication, and in such a case antennas 417 and 427 may illustrate any form of communication hardware, without being limited to merely an antenna. Likewise, some network elements 410 may be solely configured for wired communication, and in such cases antenna 417 may illustrate any form of wired communication hardware, such as a network interface card.

Transceivers 416 and 426 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network element deliver local content. One or more functionalities may also be implemented as virtual application(s) in software that can run on a server.

A user device or user equipment 420 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In an exemplary embodiment, an apparatus, such as a node or user device, may include means for carrying out embodiments described above in relation to FIG. 3.

Processors 414 and 424 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 415 and 425 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 410 and/or UE 420, to perform any of the processes described above (see, for example, FIG. 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 4 illustrates a system including a network element 410 and a UE 420, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node. The UE 420 may likewise be provided with a variety of configurations for communication other than communication network element 410. For example, the UE 420 may be configured for device-to-device communication.

Certain embodiments may provide various benefits and/or advantages. For example, certain embodiments may provide cross reporting of empty buffers to maximize uplink throughput in dual connectivity. Furthermore, certain embodiments may provide more information about potential UL transmission in the other MAC entity to enhance utilization of UE power and improve UL throughput.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

BSR Buffer Status Report
CQI Channel Quality Indicator
DRB Data Radio Bearer
MAC Media Access Control
MCG Master Cell Group
MeNB Master eNB
SCG Secondary Cell Group
SeNB Secondary eNB
UP User Plane

We claim:

1. An apparatus, comprising:
at least one processor;
and at least one memory including computer program code,
wherein the at least one memory and the computer program code are configured to, with the at least one processor, cause the apparatus at least to:
determine, at a device for a plurality of cell groups, whether there is data to transmit on each cell group; and
cross-report, to a base station of a first cell group of the plurality of cell groups configured to exchange at least one configuration of a periodic channel quality indicator on a physical uplink control channel with a second cell group of the plurality of cell groups, a buffer status indication corresponding to the second cell group of the plurality of cell groups, wherein the buffer status indication is a binary indication corresponding to the second cell group comprising at least one medium access control packet data unit configured to include at least one payloadless logical channel identifier sub-header when at least one buffer status report associated with the secondary cell group is empty and to not include the at least one payloadless logical channel identifier sub-header when at least one buffer status report associated with the secondary cell group is not empty, wherein the device comprises a split medium access control entity served by both of a radio link control entity of a first medium access control entity corresponding to the first cell group and a radio link control entity of a second medium access control entity corresponding to the second cell group.

2. The apparatus of claim 1, wherein the buffer status indication does not take into account at least one logical channel group configuration of the second cell group.

3. The apparatus of claim 1, wherein the cross-reporting is triggered when a buffer status report is triggered for the first cell group.

4. The apparatus of claim 1, wherein the cross-reporting is triggered when a buffer status of the second cell group changes from empty to not-empty or from not-empty to empty.

5. An apparatus, comprising:
at least one processor; and
at least one memory including computer program code,
wherein the at least one memory and the computer program code are configured to, with the at least one processor, cause the apparatus at least to:
receive, at a base station of a first cell group of a plurality of cell groups configured to exchange at least one configuration of a periodic channel quality indicator on a physical uplink control channel with a second cell group of the plurality of cell groups, a buffer status indication regarding the second cell group of the plurality of cell groups, wherein the buffer status indication is a binary indication corresponding to the second cell group comprising at least one medium access control packet data unit configured to include at least one payloadless logical channel identifier sub-header when at least one buffer status report associated with the secondary cell group is empty and to not include the at least one payloadless logical channel identifier sub-header when at least one buffer status report associated with the secondary cell group is not empty, wherein the buffer status indication is received from a device, and wherein the device comprises a split medium access control entity served by both of a radio link control entity of a first medium access control entity corresponding to the first cell group and a radio link control entity of a second medium access control entity corresponding to the second cell group; and control, by the base station, scheduling of the device for the first cell group based on the buffer status indication.

6. The apparatus of claim 5, wherein the buffer status indication does not take into account the logical channel group configuration of the second cell group.

7. A computer program product, embodied on a non-transitory computer readable medium, the computer program product configured to control a processor to perform a process, comprising:

determining, at a device for a plurality of cell groups, whether there is data to transmit on each cell group; and cross-reporting, to a base station of a first cell group of the plurality of cell groups configured to exchange at least one configuration of a periodic channel quality indicator on a physical uplink control channel with a second cell group of the plurality of cell groups, a buffer status indication corresponding to the second cell group of the plurality of cell groups, wherein the buffer status indication is a binary indication corresponding to the second cell group comprising at least one medium access control packet data unit configured to include at least one payloadless logical channel identifier sub-header when at least one buffer status report associated with the secondary cell group is empty and to not include the at least one payloadless logical channel identifier sub-header when at least one buffer status report associated with the secondary cell group is not empty, wherein the device comprises a split medium access control entity served by both of a radio link control entity of a first medium access control entity corresponding to the first cell group and a radio link control entity of a second medium access control entity corresponding to the second cell group.

8. The computer program product of claim 7, further configured to trigger the cross-reporting when a buffer status report is triggered for the first cell group.

9. A computer program product, embodied on a non-transitory computer readable medium, the computer program product configured to control a processor to perform a process, comprising:

receiving, at a base station of a first cell group of a plurality of cell groups configured to exchange at least one configuration of a periodic channel quality indicator on a physical uplink control channel with a second cell group of the plurality of cell groups, a buffer status indication regarding the second cell group of the plurality of cell groups, wherein the buffer status indication is a binary indication corresponding to the second cell group comprising at least one medium access control packet data unit configured to include at least one payloadless logical channel identifier sub-header when at least one buffer status report associated with the secondary cell group is empty and to not include the at least one payloadless logical channel identifier sub-header when at least one buffer status report associated with the secondary cell group is not empty, wherein the buffer status indication is received from a device, wherein the device comprises a split medium access control entity served by both of a radio link control entity of a first medium access control entity corresponding to the first cell group and a radio link control entity of a second medium access control entity corresponding to the second cell group; and controlling, by the base station, scheduling of the device for the first cell group based on the buffer status indication.

* * * * *